United States Patent
McAleer (10) Patent No.: US 9,164,820 B1
(45) Date of Patent: Oct. 20, 2015

(54) SYSTEM AND METHOD FOR CORRECTING SCRAMBLED MESSAGES

(71) Applicant: Quest Software, Inc., Aliso Viejo, CA (US)

(72) Inventor: David McAleer, Toronto (CA)

(73) Assignee: Dell Software Inc., Aliso Viejo, CA (US)

(*) Notice: Subject to any disclaimer, the term of this patent is extended or adjusted under 35 U.S.C. 154(b) by 212 days.

(21) Appl. No.: 13/906,262

(22) Filed: May 30, 2013

(51) Int. Cl.
G06F 11/00 (2006.01)
G06F 11/07 (2006.01)
G06F 11/26 (2006.01)

(52) U.S. Cl.
CPC ............. *G06F 11/07* (2013.01); *G06F 11/26* (2013.01)

(58) Field of Classification Search
CPC ..... G06F 11/07; G06F 11/2017; G06F 11/26; G06F 11/28; G06F 11/0736; G06F 11/3003; H04L 1/00
USPC .................. 714/2, 48–50, 746, 758, 763, 774
See application file for complete search history.

(56) References Cited

U.S. PATENT DOCUMENTS

| | | | |
|---|---|---|---|
| 6,934,873 B2 * | 8/2005 | Lu et al. | 714/2 |
| 6,993,677 B1 * | 1/2006 | Wilner | 714/6.21 |
| 7,281,169 B2 * | 10/2007 | Golasky et al. | 714/43 |
| 7,389,462 B1 * | 6/2008 | Wang et al. | 714/748 |
| 7,489,977 B2 * | 2/2009 | Duffy et al. | 700/79 |
| 7,725,804 B2 | 5/2010 | Shihab | |
| 8,351,861 B2 | 1/2013 | Min et al. | |
| 8,359,055 B2 | 1/2013 | Usuda et al. | |
| 8,397,120 B2 | 3/2013 | Lor et al. | |
| 2013/0042162 A1 | 2/2013 | Muthu | |

OTHER PUBLICATIONS

GE MDS, "MDS NETview MS Network Management Software", Mar. 7, 2007, 2 pages.

* cited by examiner

*Primary Examiner* — Shelly A Chase
(74) *Attorney, Agent, or Firm* — Winstead PC (57) ABSTRACT

In one embodiment, a method includes receiving a scrambled message over a network connection. The method further includes detecting one or more embedded responses in the scrambled message. In addition, the method includes discovering any streamed embedded responses of the one or more embedded responses. Further, the method includes, responsive to the discovering of any streamed embedded responses, determining whether all of the one or more embedded responses validate. Moreover, the method includes, responsive to a determination that fewer than all of the one or more embedded responses validate, discovering any interleaved embedded responses of the one or more embedded responses. The method also includes, responsive to the discovering of any interleaved embedded responses, determining whether all of the one or more embedded responses validate. Additionally, the method includes, responsive to a determination that all of the one or more embedded responses validate, retaining the one or more responses.

20 Claims, 5 Drawing Sheets

SYSTEM AND METHOD FOR CORRECTING SCRAMBLED MESSAGES

BACKGROUND

1. Technical Field

The present invention relates generally to network error correction and more particularly, but not by way of limitation, to systems and methods for correcting scrambled messages.

2. History of Related Art

On a communications network, a monitoring node may periodically issue commands to monitored devices. The commands typically request certain data such as, for example, a firmware version, a status, or other information. In response, the monitored devices typically transmit messages (i.e., responses) that provide the requested data. Oftentimes, particularly in communications networks such as radio networks and serial-communication networks, network unreliability and/or environmental conditions can cause the messages to arrive scrambled. That is, the messages may no longer conform to a sequence of fields required by a message format. For example, a single scrambled message may contain noise, have multiple distinct messages randomly interleaved therein, etc. Traditionally, scrambled messages are handled utilizing a combination of checksums and retransmissions. For the most part, scrambled messages must be discarded.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method comprises, on an information handling system, receiving a scrambled message over a network connection, detecting, by the information handling system, one or more embedded responses in the scrambled message. The method further includes discovering, by the information handling system, any streamed embedded responses of the one or more embedded responses. In addition, the method includes, responsive to the discovering of any streamed embedded responses, determining whether all of the one or more embedded responses validate. The method also includes, responsive to a determination that fewer than all of the one or more embedded responses validate, discovering, by the information handling system, any interleaved embedded responses of the one or more embedded responses. The method additionally includes, responsive to the discovering of any interleaved embedded responses, determining whether all of the one or more embedded responses validate. Furthermore, the method includes, responsive to a determination that all of the one or more embedded responses validate, the information handling system retaining the one or more responses.

In one embodiment, an information handling system includes a processing unit. The processing unit is operable to implement a method. The method includes receiving a scrambled message over a network connection. The method further includes detecting one or more embedded responses in the scrambled message. In addition, the method includes discovering any streamed embedded responses of the one or more embedded responses. Further, the method includes, responsive to the discovering of any streamed embedded responses, determining whether all of the one or more embedded responses validate. Moreover, the method includes, responsive to a determination that fewer than all of the one or more embedded responses validate, discovering any interleaved embedded responses of the one or more embedded responses. The method also includes, responsive to the discovering of any interleaved embedded responses, determining whether all of the one or more embedded responses validate. Additionally, the method includes, responsive to a determination that all of the one or more embedded responses validate, retaining the one or more responses.

In one embodiment, a computer-program product includes a computer-usable medium having computer-readable program code embodied therein. The computer-readable program code is adapted to be executed to implement a method. The method includes receiving a scrambled message over a network connection. The method further includes detecting one or more embedded responses in the scrambled message. In addition, the method includes discovering any streamed embedded responses of the one or more embedded responses. Further, the method includes, responsive to the discovering of any streamed embedded responses, determining whether all of the one or more embedded responses validate. Moreover, the method includes, responsive to a determination that fewer than all of the one or more embedded responses validate, discovering any interleaved embedded responses of the one or more embedded responses. The method also includes, responsive to the discovering of any interleaved embedded responses, determining whether all of the one or more embedded responses validate. Additionally, the method includes, responsive to a determination that all of the one or more embedded responses validate, retaining the one or more responses.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, scrambled messages can better detected and corrected via principles described herein. A scrambled message, as used herein, refers to a message that does not conform to a message format. A message format, as used herein, refers to predetermined spatial or time-sequential arrangements of parts of a message. The parts of a message may be referred to herein as fields.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
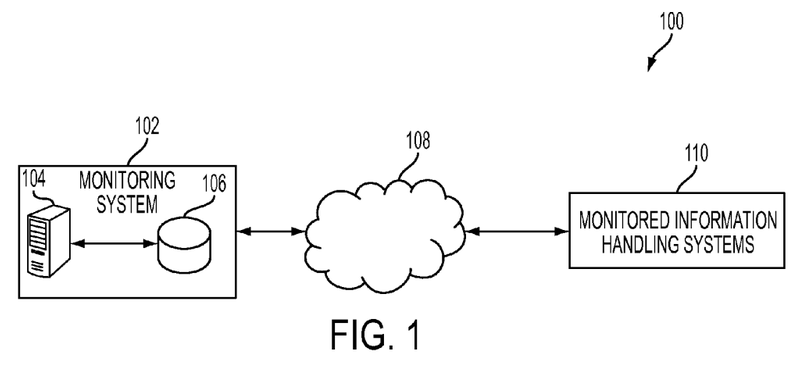
FIG. 1 illustrates a system for detecting and correcting scrambled messages.

FIG. 1 illustrates a system 100 for detecting and correcting scrambled messages. The system 100 includes a monitoring system 102 communicating with a plurality of monitored information handling systems 110 over a communications network 108. In some embodiments, the monitoring system 102 monitors and controls the monitored information handling systems 110. For example, in various embodiments, the monitoring system 102 may encompass an industrial control system such as, for example, a supervisory control and data acquisition (SCADA) system or a distributed control system (DCS). In various other embodiments, the monitoring system 102 is merely representative of network node at which messages may be received. In these embodiments, the monitoring system 102 is not necessarily distinct from the monitored information handling systems 110.

It should be appreciated that the network 108 is intended to abstract a plurality of networks over which the monitoring system 102 may be operable to communicate. In particular, the network 108 logically represents all communication infrastructure for connecting the monitoring system 102 to each of the monitored information handling systems 110. The network 108 can include any number of wired and/or wireless communications networks such as, for example, public or private intranets, the Internet, public switched telephone networks (PSTNs), cellular networks, satellite communication, and the like. To the extent a particular information handling system of the monitored information handling systems 110 connects to the monitoring system 102 through others of the monitored information handling systems 110, for purposes of communication between the monitoring system 102 and the particular information handling system, the network 108 can be considered to include those other information handling systems.

The monitored information handling systems 110 can include, for example, field devices (e.g., programmable logic controllers (PLCs)) that control or monitor local operations such as opening and closing valves and breakers, sensor systems, remote terminal units (RTUs) that connect to and gather data from sensor systems, and the like. The monitored information handling systems 110 can also include, for example, server computers, desktop computers, laptop computers, tablet computers, and smartphones. The monitored information handling systems 110 can also include networking equipment such as, for example, routers, switches, wireless access points, and the like. In various embodiments, subsets of the monitored information handling systems 110 may be interconnected. Each interconnected subset may be arranged into a network topology that has, for example, a tree structure. In this manner, some of the monitored information handling systems 110 may be effectively dependent upon others of the monitored information handling systems 110. The monitored information handling systems 110 may also be geographically dispersed on a global level.

The monitoring system 102 is operable to periodically issue commands to the monitored information handling systems 110 over the communications network 108. The commands may request certain data such as, for example, a status, a firmware version, or other information. The monitored information handling systems 110, in turn, are operable to transmit responses, often asynchronously, over the network 108. In a typical embodiment, the monitoring system 102 is operable to detect and correct when one or more of the responses arrive as scrambled messages. Examples will be described with respect to FIGS. 2-5.

Figure 2:
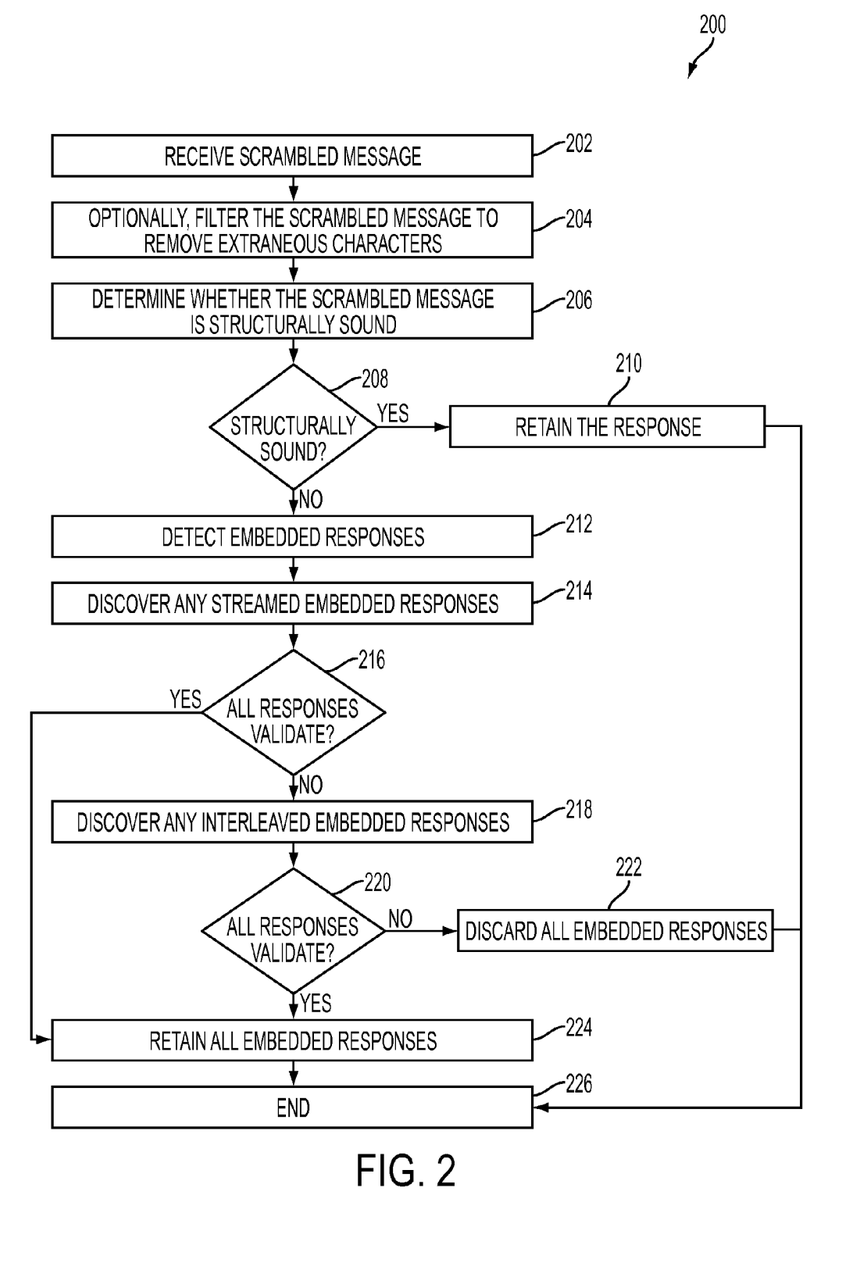
FIG. 2 illustrates a process for correcting scrambled messages.

FIG. 2 illustrates a process 200 for correcting scrambled messages. In a typical embodiment, the process 200 is performed by a monitoring system such as, for example, the monitoring system 102 of FIG. 1. The process 200 begins at step 202. At step 202, the monitoring system receives a scrambled message. In a typical embodiment, the scrambled message may contain one or more responses to an original command issued by the monitoring system. In some embodiments, a step of identifying a message as scrambled may be subsumed within step 202. From step 202, the process 200 proceeds to step 204.

At step 204, the monitoring system optionally filters the scrambled message to remove extraneous characters. What constitutes extraneous characters can vary depending on a particular implementation. For example, if a message format specifies that only a predefined set of characters be used, any characters that are not part of the predefined set may be considered noise and removed. For instance, some message formats may specify that hexadecimal characters be exclusively used. In these embodiments, any characters that are not hexadecimal characters may be removed at step 204. From step 204, the process 200 proceeds to step 206.

At step 206, the monitoring system determines whether the scrambled message is structurally sound. In a typical embodiment, the scrambled message is considered structurally sound if, after any filtering at step 202, the scrambled message conforms to a sequence of fields specified by the message format (i.e., is no longer scrambled). If it is determined at step 208 that the scrambled message is structurally sound, the process 200 proceeds to step 210. At step 210, the scrambled message is retained. From step 210, the process 200 proceeds to step 226 and ends.

If it is determined at step 208 that the scrambled message is not structurally sound, the process 200 proceeds to step 212. At step 212, the monitoring system detects one or more embedded responses in the scrambled message. The detection typically involves determining how many responses are embedded within the scrambled message. In certain embodiments, responses can be detected by scanning for response indicators. In a typical embodiment, response indicators are codes, characters, or other types of values that only occur once per response. The response indicators may be, for example, response-start indicators or response-end indicators. Response-start indicators may be, for example, a control code or character that indicates a beginning of a response. Response-end indicators may be, for example, a control code or character that indicates an end of a response. From step 212, the process 200 proceeds to step 214.

At step 214, the monitoring system attempts to discover any streamed embedded responses. A streamed embedded response is a valid response that appears contiguously in the scrambled message without interruption by noise or other characters such as, for example, portions of another response. More particularly, a streamed embedded response generally includes a complete, contiguous set of fields in an order specified by the message format. For example, suppose the scrambled message contained "aaabbbbbbaaa." If "bbbbbb" were a valid, intended response, "bbbbbb" would be considered a streamed embedded response. Additionally, identification of "bbbbbb" as a streamed embedded response would enable identification of "aaaaaa" as an embedded response. An example of discovering streamed embedded responses will be described in more detail with respect to FIG. 3.

From step 214, the process 200 proceeds to step 216. At step 216, the monitoring system determines whether all responses embedded within the scrambled message successfully validate following the discovery at step 214. In a typical embodiment, all responses are determined to successfully validate if a total number of discovered embedded responses equals a total number of embedded responses that were detected at step 212. If it is determined at step 216 that all responses embedded within the scrambled message successfully validate, the process 200 proceeds to step 224. At step 224, all embedded responses are retained. From step 224, the process 200 proceeds to step 226 and ends.

If it is determined at step 216 that fewer than all responses within the scrambled message successfully validate, the process 200 proceeds to step 218. At step 218, the monitoring system attempts to discover any interleaved embedded responses. An interleaved embedded response is a response that is entirely contained within the scrambled message but is not contiguous. For example, suppose the scramble message contained "aabbaabbaabb." If "aaaaaa" and "bbbbbb" were intended responses, each intended response would be considered an interleaved embedded message. In some embodiments, the discovery at step 218 is performed with respect to an entirety of the scrambled message and ignores any embedded messages discovered at step 214. In other embodiments, the discovery at step 218 leverages any embedded responses already discovered at step 214 and only conducts discovery with respect to a remainder of the scrambled message. Examples of discovering interleaved embedded responses will be described with respect to FIGS. 4-5.

From step 218, the process 200 proceeds to step 220. At step 220, the monitoring system determines whether all embedded responses successfully validate following the discovery at step 218. In a typical embodiment, all responses are determined to successfully validate if a total number of discovered embedded responses equals a total number of embedded responses that were detected at step 212. If it is determined at step 220 that all embedded responses successfully validate, the process 200 proceeds to step 224. At step 224, all embedded responses are retained as described above. From step 224, the process 200 proceeds to step 226 and ends.

If it is determined at step 220 that fewer than all responses within the scrambled message successfully validate, the process 200 proceeds to step 222. At step 222, all embedded responses are discarded. Although the process 200 describes the embedded responses as being discarded for purposes of illustration, in some embodiments, a higher error tolerance may enable some of the embedded responses to be retained and used. From step 222, the process 200 proceeds to step 226 and ends.

It should be appreciated that the order and arrangement of steps in the process 200 is presented as an example of inventive principles. In various embodiments, various steps may be omitted, modified, or rearranged. For example, in some embodiments, the discovery of streamed embedded responses at step 212 may be omitted. Rather, the discovery described with respect to step 214 may be relied upon for both streamed embedded responses and interleaved embedded responses. Other modifications and optimizations will be apparent to one of ordinary skill in the art after reviewing the inventive principles described herein.

Figure 3:
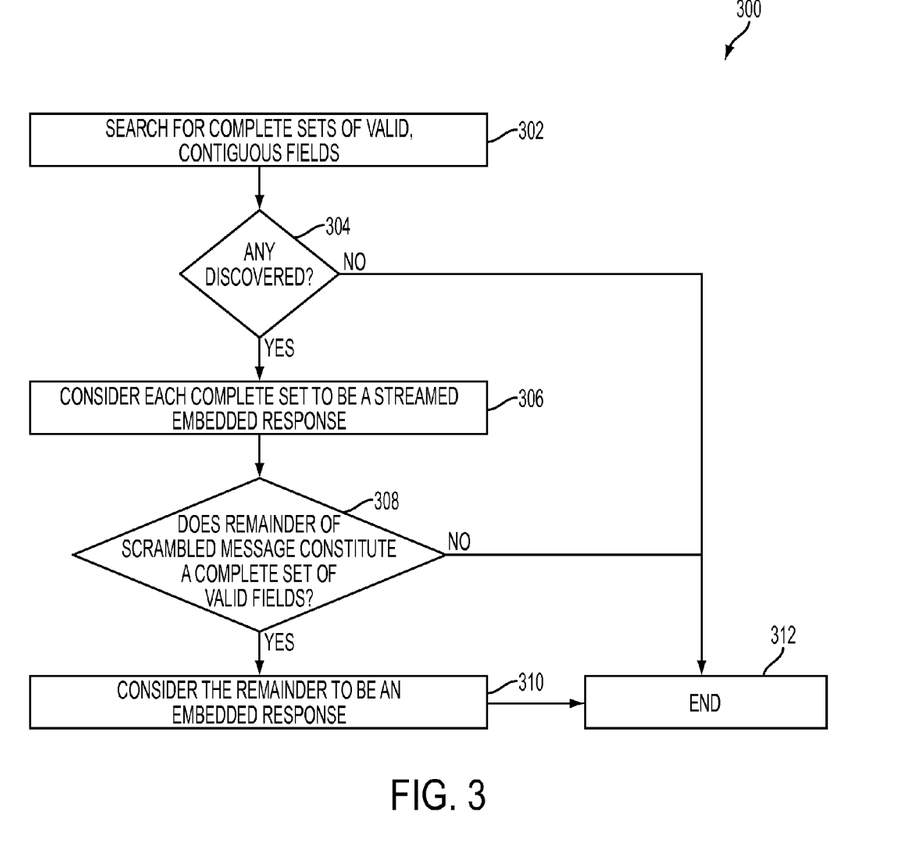
FIG. 3 illustrates a process for discovering streamed embedded responses.

FIG. 3 illustrates a process 300 for discovering streamed embedded responses. The process 300 may be performed by a monitoring system such as, for example, the monitoring system 102 of FIG. 1. For example, the process 300 may be performed as all or part of step 214 of the process 200 of FIG. 2. The process 300 begins at step 302.

At step 302, the monitoring system searches for complete sets of valid, contiguous fields. In a typical embodiment, the monitoring system checks each embedded response detected, for example, at step 212 of the process 200, beginning with the embedded response's response-start indicator. An example of how a set of fields may be considered valid will be described relative to interleaved embedded responses with respect to FIG. 5. From step 302, the process 300 proceeds to step 304. At step 304, the monitoring system determines whether any complete sets of valid, contiguous fields were discovered at step 302. If it is determined at step 304 that no complete sets of valid, contiguous fields were discovered, the process 300 proceeds to step 312 and ends. If it is determined at step 304 that at least one complete set of valid, contiguous fields was discovered, the process 300 proceeds to step 306.

At step 306, each complete set is considered to be a streamed embedded response. From step 306, the process 300 proceeds to step 308. At step 308, the monitoring system determines whether a remainder of the scrambled message constitutes a complete set of valid fields. The remainder generally encompasses the scrambled message without any streamed embedded responses. If it is determined at step 308 that that the remainder of the scrambled message constitutes a complete set of valid fields, the process 300 proceeds to step 310. At step 310, the remainder of the scrambled message is considered to be an embedded response. From step 310, the process 300 proceeds to step 312 and ends. If it is determined at step 308 that the remainder of the scrambled message does not constitute a complete set of valid fields, the process 300 proceeds to step 312 and ends.

Figure 4:
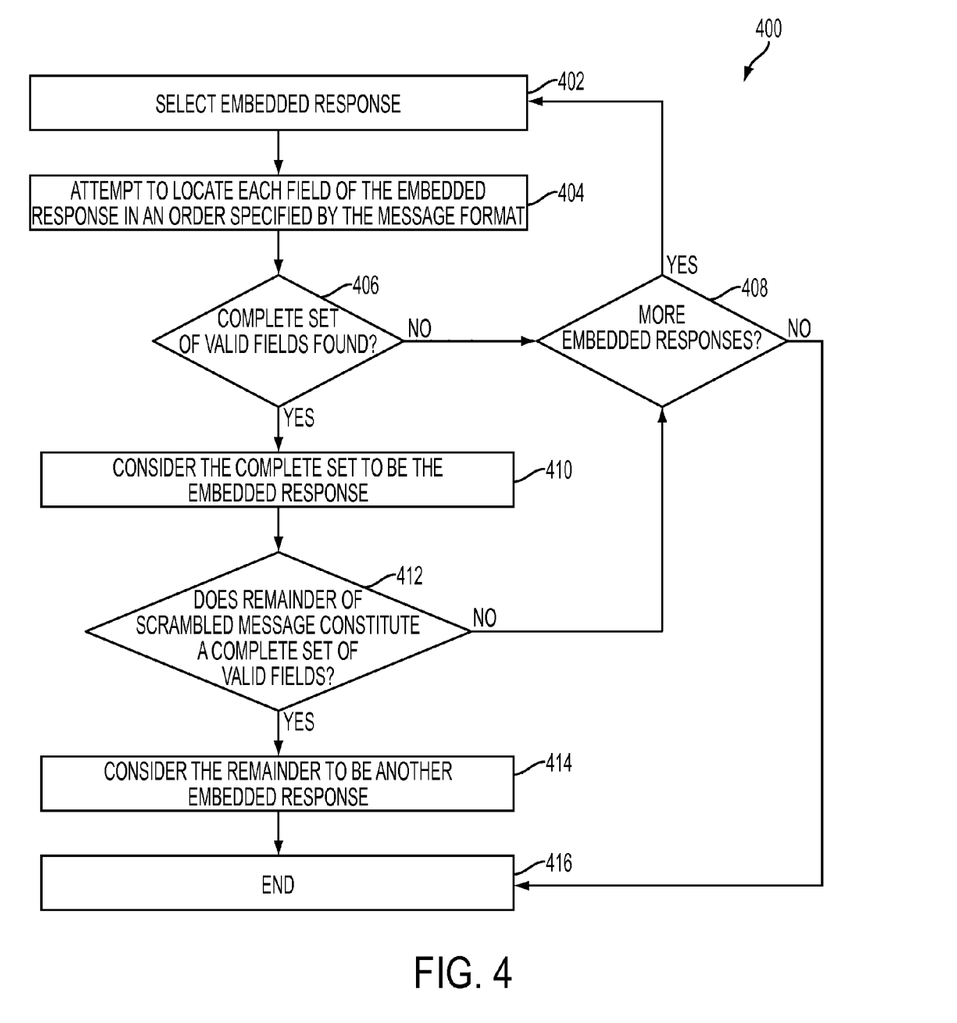
FIG. 4 illustrates a process for discovering interleaved embedded responses.

FIG. 4 illustrates a process 400 for discovering interleaved embedded responses. The process 400 may be performed by a monitoring system such as, for example, the monitoring system 102 of FIG. 1. The process 400 may be performed as all or part of step 218 of the process 200 of FIG. 2. In a typical embodiment, the process 400 iterates through each embedded response detected, for example, at step 212 of the process 200. In embodiments in which the process 400 is conducted with respect to only a portion of a scrambled message as described with respect to FIG. 2, the monitoring system may iterate through only those embedded responses that were not discovered, for example, as streamed embedded responses during a process such as the process 300 of FIG. 3. The process 400 begins at step 402.

At step 402, the monitoring system selects an embedded response. From step 402, the process 400 proceeds to step 404. At step 404, the monitoring system attempts to validly locate each field of the embedded response in an order specified by the message format. Typically, the monitoring system looks for a complete set of fields that is internally consistent, conforms to a format and sequence specified by the message format, complies with the monitoring system's expectations for each field's value, corresponds to an original command issued by the monitoring system, and/or meets other requirements. An example will be described with respect to FIG. 5. From step 404, the process 400 proceeds to step 406.

At step 406, the monitoring system determines whether a complete set of valid fields was located at step 404. If it is determined at step 406 that a complete set of valid fields was not found, the process 400 proceeds directly to step 408 (described below). If it is determined at step 406 that a complete set of valid fields was found, the process 400 proceeds to step 410. At step 410, the complete set is deemed to constitute the embedded response. From step 410, the process 400 proceeds to step 412.

At step 412, the monitoring system determines whether a remainder of the scrambled message constitutes a complete set of valid fields. The remainder generally encompasses the scrambled message without any interleaved embedded responses. If it is determined at step 412 that that the remainder of the scrambled message constitutes a complete set of valid fields, the process 400 proceeds to step 414. At step 414, the remainder of the scrambled message is considered to be another embedded response. From step 414, the process 400 proceeds to step 416 and ends. If it is determined at step 412 that the remainder of the scrambled message does not constitute a complete set of valid fields, the process 400 proceeds to step 408.

At step 408, the monitoring system determines whether there are additional embedded responses through which the process 400 has not yet iterated. If so, the process 400 returns to step 402 for selection of another embedded response. If it is determined at step 410 that there are no additional embedded responses through which the process 400 has not yet iterated, the process 400 proceeds to step 412. At step 412, the process 400 ends.

As described above, a message format can take numerous forms. For illustrative purposes, an example of a message format will now be described. It should be appreciated that this example is being described solely for purposes of explaining various inventive principles to one of ordinary skill in the art. Table 1 below lists fields of an exemplary message format. The exemplary message format specifies a length of each field and a field sequence (i.e., the order in which the fields are listed in Table 1). Message formats can take numerous other forms without deviating from the principles described herein. For example, in place of a payload-length field, various embodiments may rely on a control code or character that signifies an end of a message. In these embodiments, the control code or character could indicate an end of an applicable payload, thereby eliminating a need for the payload-length field.

TABLE 1

| FIELD | LENGTH | DESCRIPTION |
| --- | --- | --- |
| Control Code | 1 byte | Indicates a start of a response and may indicate a message type. For example, the control code can be one of the following set: m, n, o, p, q. |
| Device Identifier | 2 bytes | Identifies a device that sent a response (e.g., in hexadecimal format). |
| Command Code | 2 bytes | Identifies a command (e.g., in hexadecimal format). |
| Payload Length | 2 byte | A length of the payload (e.g., in hexadecimal format). |
| Payload | Variable | Data such as, for example, data responsive to a command from a monitoring system (e.g., in hexadecimal format). |

Figure 5:
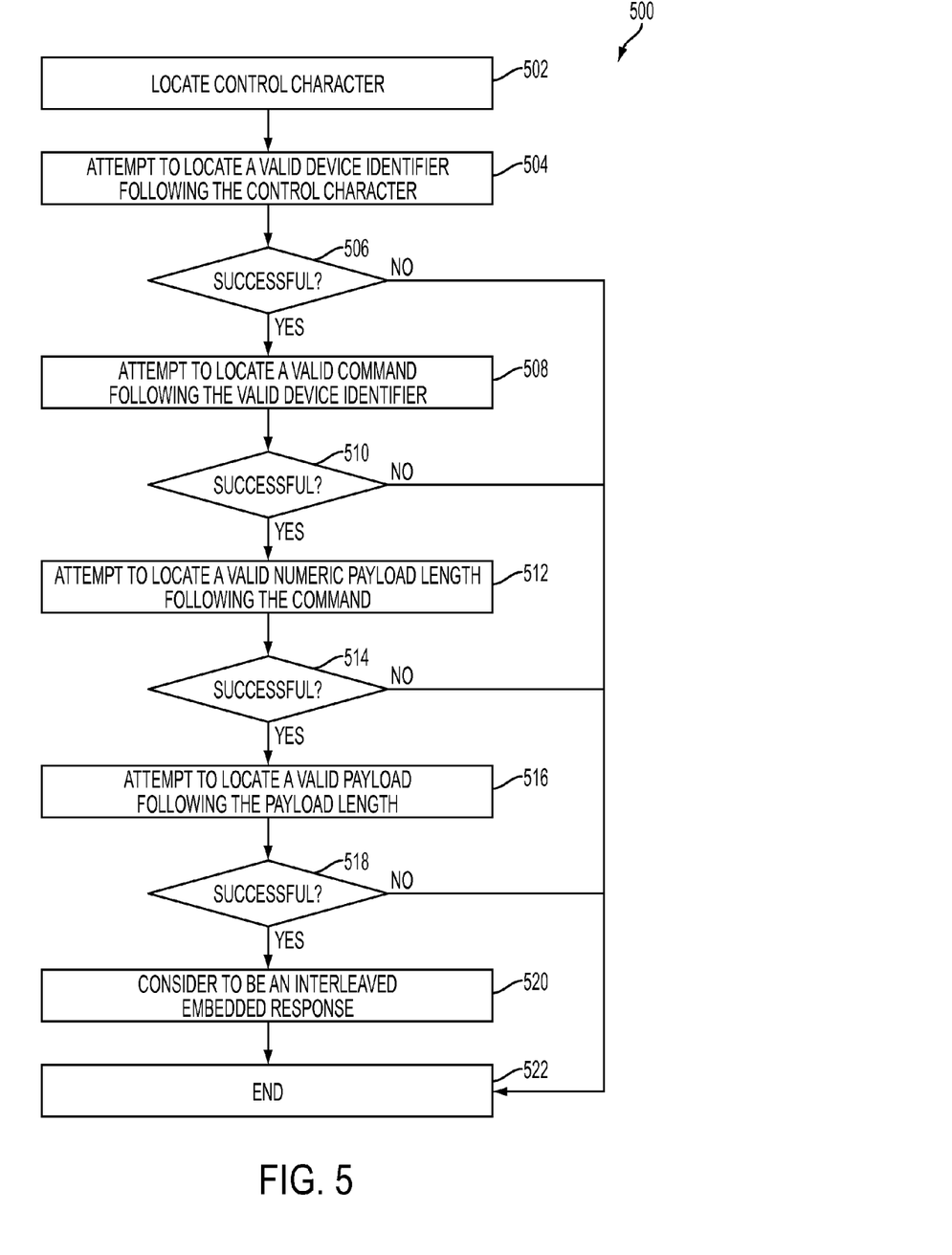
FIG. 5 illustrates a process for attempting to locate each field of an embedded response.

FIG. 5 illustrates a process 500 for attempting to locate each field of an embedded response in a scrambled message. The process 500 may be performed by a monitoring system such as, for example, the monitoring system 102 of FIG. 1. The process 500 may be performed as all or part of step 404 of the process 400 of FIG. 4. For purposes of illustration, the process 500 operates with respect to the exemplary message format described above with respect to Table 1. The process 500 begins at step 502.

At step 502, the monitoring system locates a control character In a typical embodiment, the control character is a response-start indicator that served as the basis for detecting embedded responses as described, for example, with respect to step 212 of the process 200 of FIG. 2. Therefore, in a typical embodiment, step 502 involves locating a previously detected control character. As indicated in Table 1, the exemplary message format specifies that a response begins with a control character that must be 'm', 'n', 'o', 'p,' or 'q.' From step 502, the process 500 proceeds to step 504.

At step 504, the monitoring system attempts to locate a valid device identifier following the control character. For purposes of the process 500, a valid device identifier is considered an address or other series of numbers and/or characters that identifies a device from which a response is expected. For example, a response may be expected due to a command issued by the monitoring system to the device. From step 504, the process 500 proceeds to step 506. At step 506, it is determined whether the monitoring system has successfully identified a valid device identifier. If not, the process 500 proceeds to step 522 and ends. Alternatively, if it is determined at step 506 that the monitoring system has successfully identified a valid device identifier, the process 500 proceeds to step 508.

At step 508, the monitoring system attempts to locate in the scrambled message a valid command following the valid device identifier. A valid command typically must correspond to, and be responsive to, an original command that was issued by the monitoring system to whatever device is identified by the valid device identifier. From step 508, the process 500 proceeds to step 510. At step 510, it is determined whether the monitoring system has successfully identified a valid command. If not, the process 500 proceeds to step 522 and ends. Alternatively, if it is determined at step 510 that the monitoring system has successfully identified a valid command, the process 500 proceeds to step 512.

At step 512, the monitoring system attempts to locate in the scrambled message a valid payload length following the valid command. In a typical embodiment, a valid payload length specifies a length such as, for example, a number of bytes, that makes sense given the valid command. For example, as long as a payload of a given length could be considered valid, the given length may be considered a valid payload length. From step 512, the process 500 proceeds to step 514. At step 514, it is determined whether the monitoring system has successfully identified a valid payload length. If not, the process 500 proceeds to step 522 and ends. Alternatively, if it is determined at step 514 that the monitoring system has successfully identified a valid command, the process 500 proceeds to step 516.

At step 516, the monitoring system attempts to locate in the scrambled message a valid payload following the valid payload length. In a typical embodiment, a payload is considered a valid payload if it is of the valid payload length and has a value that is appropriate given the valid command and/or given the original command issued by the monitoring system. For example, given the valid command, the payload may be expected to satisfy certain criteria such as, for example, having a particular value, having a value selected from a particular set of values, falling within a particular range of values, and/or the like. From step 516, the process 500 proceeds to step 518.

At step 518, it is determined whether the monitoring system has successfully identified a valid payload. If not, the process 500 proceeds to step 522 and ends. Alternatively, if it is determined at step 518 that the monitoring system has successfully identified a valid payload, the process 500 proceeds to step 520. At step 520, a set of fields defined by the valid device identifier, the valid command, the valid payload length, and the valid payload is considered to be an interleaved embedded response. From step 520, the process 500 proceeds to step 522. At step 522, the process 500 ends.

In a typical embodiment, the process 500 may be performed for each embedded response as described with respect to the process 400. For example, suppose a particular scrambled message is defined by "mFEm00FD02007E02625D33." According to this example, each 'm' is a control code that serves as a response-start indicator (i.e., at index zero and index three). When performing the process 500 with respect to the particular scrambled message, the monitoring system may identify "FD," "00," "02" and "5D33" as a valid device identifier, a valid command, a valid payload length, and a valid payload, respectively. Therefore, "FD00025D33" may be considered to be an interleaved embedded response. As result of the discovery of the interleaved embedded response, the monitoring system may identify "FE," "00," "02" and "7E62" as a valid device identifier, a valid command, a valid payload length, and a valid payload, respectively. Therefore, "FE00027E62" may be considered to be another embedded response as described with respect to step 414 of FIG. 4.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on an information handling system, receiving a scrambled message over a network connection;
    detecting, by the information handling system, one or more embedded responses in the scrambled message;
    discovering, by the information handling system, any streamed embedded responses of the one or more embedded responses;
    responsive to the discovering of any streamed embedded responses, determining whether all of the one or more embedded responses validate;
    responsive to a determination that fewer than all of the one or more embedded responses validate, discovering, by the information handling system, any interleaved embedded responses of the one or more embedded responses;
    responsive to the discovering of any interleaved embedded responses, determining whether all of the one or more embedded responses validate; and
    responsive to a determination that all of the one or more embedded responses validate, the information handling system retaining the one or more responses.

2. The method of claim 1, comprising, prior to the detecting, filtering the scrambled message to remove extraneous characters.

3. The method of claim 2, wherein the extraneous characters comprise any characters that are non-hexadecimal characters.

4. The method of claim 2, comprising:
    responsive to the filtering, determining whether the filtered scrambled message is structurally sound;
    retaining the filtered scrambled message as a response if the filtered scrambled message is determined to be structurally sound; and
    wherein the detecting is only performed responsive to a determination that the filtered scrambled message is not structurally sound.

5. The method of claim 1, wherein the detecting comprises scanning the scrambled message for one or more response indicators, the one or more response-start indicators selected from the group consisting of: response-start indicators and response-end indicators.

6. The method of claim 1, wherein the discovering of streamed embedded responses comprises:
    searching the scrambled message for one or more complete sets of valid and contiguous fields;
    considering each complete set to be a streamed embedded response; and
    responsive to a determination that a remainder of the scrambled message constitutes a complete set of valid fields, considering the remainder to constitute one of the one or more embedded responses.

7. The method of claim 1, wherein the discovering of interleaved embedded responses comprises, for at least one embedded response of the one or more embedded responses:
    attempting to locate in the scrambled message each field of the at least one embedded response in an order specified by a message format; and
    responsive to a determination that a complete set of valid fields has been found, considering the complete set to be the at least one embedded response.

8. The method of claim 7, wherein the discovering of interleaved embedded responses comprises, responsive to a determination that a remainder of the scrambled message constitutes a complete set of valid fields, considering the remainder to constitute another of the one or more embedded responses.

9. The method of claim 7, wherein the discovering of interleaved embedded responses iterates through each embedded response of the one or more embedded responses.

10. The method of claim 7, wherein the attempting to locate comprises attempting to locate a response-start indicator, a device identifier, a payload length, and a payload.

11. The method of claim 7, wherein the attempting to locate comprises:

locating in the scrambled message a response-start indicator;

locating in the scrambled message a valid device identifier following the response-start indicator;

locating a valid command following the valid device identifier;

locating a valid payload length following the command;

locating a valid payload following the payload length; and considering the response-start indicator, the valid device identifier, the valid command, the valid payload length, and the valid payload to constitute an interleaved embedded response.

12. An information handling system, comprising:

a processing unit, wherein the processing unit is operable to implement a method comprising:

receiving a scrambled message over a network connection;

detecting one or more embedded responses in the scrambled message;

discovering any streamed embedded responses of the one or more embedded responses;

responsive to the discovering of any streamed embedded responses, determining whether all of the one or more embedded responses validate;

responsive to a determination that fewer than all of the one or more embedded responses validate, discovering any interleaved embedded responses of the one or more embedded responses;

responsive to the discovering of any interleaved embedded responses, determining whether all of the one or more embedded responses validate; and responsive to a determination that all of the one or more embedded responses validate, retaining the one or more responses.

13. The information handling system of claim 12, the method comprising, prior to the detecting, filtering the scrambled message to remove extraneous characters.

14. The information handling system of claim 13, the method comprising:

responsive to the filtering, determining whether the filtered scrambled message is structurally sound;

retaining the filtered scrambled message as a response if the filtered scrambled message is determined to be structurally sound; and wherein the detecting is only performed responsive to a determination that the filtered scrambled message is not structurally sound.

15. The information handling system of claim 12, wherein the detecting comprises scanning the scrambled message for one or more response indicators, the one or more response-start indicators selected from the group consisting of: response-start indicators and response-end indicators.

16. The information handling system of claim 12, wherein the discovering of streamed embedded responses comprises:

searching the scrambled message for one or more complete sets of valid and contiguous fields;

considering each complete set to be a streamed embedded response; and responsive to a determination that a remainder of the scrambled message constitutes a complete set of valid fields, considering the remainder to constitute one of the one or more embedded responses.

17. The information handling system of claim 12, wherein the discovering of interleaved embedded responses comprises, for at least one embedded response of the one or more embedded responses:

attempting to locate in the scrambled message each field of the at least one embedded response in an order specified by a message format;

responsive to a determination that a complete set of valid fields has been found, considering the complete set to be the at least one embedded response; and responsive to a determination that a remainder of the scrambled message constitutes a complete set of valid fields, considering the remainder to constitute another of the one or more embedded responses.

18. The information handling system of claim 17, wherein the attempting to locate comprises attempting to locate a response-start indicator, a device identifier, a payload length, and a payload.

19. The information handling system of claim 17, wherein the attempting to locate comprises:

locating in the scrambled message a response-start indicator;

locating in the scrambled message a valid device identifier following the response-start indicator;

locating a valid command following the valid device identifier;

locating a valid payload length following the command;

locating a valid payload following the payload length; and considering the response-start indicator, the valid device identifier, the valid command, the valid payload length, and the valid payload to constitute an interleaved embedded response.

20. A computer-program product comprising a non-transitory computer-usable medium having computer-readable program code embodied therein, the computer-readable program code adapted to be executed to implement a method comprising:

receiving a scrambled message over a network connection;

detecting one or more embedded responses in the scrambled message;

discovering any streamed embedded responses of the one or more embedded responses;

responsive to the discovering of any streamed embedded responses, determining whether all of the one or more embedded responses validate;

responsive to a determination that fewer than all of the one or more embedded responses validate, discovering any interleaved embedded responses of the one or more embedded responses;

responsive to the discovering of any interleaved embedded responses, determining whether all of the one or more embedded responses validate; and responsive to a determination that all of the one or more embedded responses validate, retaining the one or more responses.

* * * * *